(12) United States Patent
Xing et al.

(10) Patent No.: US 12,743,710 B2
(45) Date of Patent: Sep. 22, 2026

(54) SYSTEMS AND METHODS FOR PROVIDING COMPENSATION, REBATE, CASHBACK, AND REWARD FOR USING MOBILE AND WEARABLE PAYMENT SERVICES, DIGITAL CURRENCY, NFC TOUCH PAYMENTS, MOBILE DIGITAL CARD BARCODE PAYMENTS, AND MULTIMEDIA HAPTIC CAPTURE BUYING

(71) Applicants: Zhou Tian Xing, Tiburon, CA (US); Tiger T G Zhou, Tiburon, CA (US)

(72) Inventors: Zhou Tian Xing, Tiburon, CA (US); Tiger T G Zhou, Tiburon, CA (US)

( * ) Notice: Subject to any disclaimer, the term of this patent is extended or adjusted under 35 U.S.C. 154(b) by 0 days.

(21) Appl. No.: 15/484,177

(22) Filed: Apr. 11, 2017

(65) Prior Publication Data

US 2017/0221087 A1 Aug. 3, 2017

Related U.S. Application Data

(63) Continuation-in-part of application No. 15/061,982, filed on Mar. 4, 2016, now Pat. No. 9,619,794, which
(Continued)

(51) Int. Cl.
*G06Q 30/0234* (2023.01)
*G06K 7/10* (2006.01)
(Continued)

(52) U.S. Cl.
CPC ....... *G06Q 30/0234* (2013.01); *G06K 7/1095* (2013.01); *G06K 19/06112* (2013.01);
(Continued)

(58) Field of Classification Search
CPC ............. G06Q 30/0226; G06Q 20/387; G06Q 20/3276; G06Q 30/0324; G06Q 30/0208;
(Continued)

(56) References Cited

U.S. PATENT DOCUMENTS 6,049,778 A * 4/2000 Walker ............... G06Q 30/0212 705/14.39
9,367,841 B2 * 6/2016 Zhou ...................... G06Q 30/06
(Continued)

*Primary Examiner* — Daniel I Walsh
(74) *Attorney, Agent, or Firm* — Georgiy L. Khayet

(57) ABSTRACT

Provided are methods and systems for facilitating mobile device payments using codes and cashback business model. Upon installation of an application on a mobile device, a customer may specify his payment information, which may include data on a credit/debit card or a bank checking account. Once the payment information has been specified, the customer may receive a unique code encoding his payment information. The customer may then start scanning product barcodes with his mobile device. To make payment for products, the unique code displayed on a screen of the customer mobile device may be scanned by a payment receiver mobile device. The payment receiver mobile device may further display customer records stored in a database of a payment processing system. Based on the customer records, the customer may be provided with various cash-back opportunities, as well as credits and discounts.

39 Claims, 11 Drawing Sheets

Related U.S. Application Data is a continuation-in-part of application No. 14/815,988, filed on Aug. 1, 2015, now Pat. No. 9,342,829, which is a continuation-in-part of application No. 14/034,509, filed on Sep. 23, 2013, now Pat. No. 9,510,277, which is a continuation-in-part of application No. 10/677,098, filed on Sep. 30, 2003, now Pat. No. 7,702,739.

(60) Provisional application No. 60/415,546, filed on Oct. 1, 2002.

(51) Int. Cl.

| | |
|---|---|
| ***G06K 19/06*** | (2006.01) |
| ***G06Q 20/32*** | (2012.01) |
| ***G06Q 20/38*** | (2012.01) |
| ***G06Q 20/40*** | (2012.01) |
| ***G06Q 30/0207*** | (2023.01) |
| ***G06Q 30/0208*** | (2023.01) |
| ***G06Q 30/0226*** | (2023.01) |
| ***G06Q 30/0251*** | (2023.01) |
| ***G06Q 30/06*** | (2023.01) |
| ***G06Q 30/0601*** | (2023.01) |

(52) U.S. Cl.

CPC ....... *G06Q 20/322* (2013.01); *G06Q 20/3274* (2013.01); *G06Q 20/3276* (2013.01); *G06Q 20/3278* (2013.01); *G06Q 20/385* (2013.01); *G06Q 20/387* (2013.01); *G06Q 20/401* (2013.01); *G06Q 20/40145* (2013.01); *G06Q 20/405* (2013.01); *G06Q 30/0208* (2013.01); *G06Q 30/0222* (2013.01); *G06Q 30/0226* (2013.01); *G06Q 30/0236* (2013.01); *G06Q 30/0239* (2013.01); *G06Q 30/0267* (2013.01); *G06Q 30/06* (2013.01); *G06Q 30/0601* (2013.01); *G06Q 30/0641* (2013.01)

(58) Field of Classification Search

CPC .. G06Q 30/06; G06Q 30/0601; G06Q 20/405; G06Q 20/322; G06Q 20/0234

See application file for complete search history.

(56) References Cited

U.S. PATENT DOCUMENTS

| | | | | |
|---|---|---|---|---|
| 9,665,865 | B1 * | 5/2017 | Xing | G06Q 20/326 |
| 9,881,297 | B2 * | 1/2018 | Kranzley | G06Q 40/00 |
| 9,934,506 | B2 * | 4/2018 | MacKinnon Keith | G06Q 20/3276 |
| 9,953,308 | B2 * | 4/2018 | Xing | G06Q 20/023 |
| 11,257,057 | B1 * | 2/2022 | Asmi | G07G 1/01 |
| 11,816,651 | B1 * | 11/2023 | Maeng | G06Q 20/36 |
| 2002/0042722 | A1 * | 4/2002 | Tsuji | G06Q 20/209 705/16 |
| 2002/0174011 | A1 * | 11/2002 | Sanchez | G06Q 30/0226 705/14.27 |
| 2004/0148253 | A1 * | 7/2004 | Shin | G06Q 20/322 705/39 |
| 2005/0040230 | A1 * | 2/2005 | Swartz | G07G 1/0072 235/383 |
| 2008/0140579 | A1 * | 6/2008 | Sanjiv | G06Q 30/0236 705/76 |
| 2009/0281904 | A1 * | 11/2009 | Pharris | G06Q 20/425 455/566 |
| 2010/0125509 | A1 * | 5/2010 | Kranzley | G06Q 20/3263 705/17 |
| 2011/0137742 | A1 * | 6/2011 | Parikh | G06Q 30/0635 705/26.1 |
| 2011/0215138 | A1 * | 9/2011 | Crum | G06Q 30/0207 235/375 |
| 2011/0251892 | A1 * | 10/2011 | Laracey | G06Q 20/20 705/16 |
| 2012/0136739 | A1 * | 5/2012 | Chung | G06Q 20/3276 705/26.1 |
| 2012/0173351 | A1 * | 7/2012 | Hanson | G06Q 30/0635 705/26.81 |
| 2012/0253913 | A1 * | 10/2012 | Richard | G06Q 20/3278 705/14.27 |
| 2013/0018715 | A1 * | 1/2013 | Zhou | G06Q 20/3274 705/26.7 |
| 2013/0018782 | A1 * | 1/2013 | Zhou | G06Q 20/3274 705/39 |
| 2013/0043305 | A1 * | 2/2013 | Zhou | G06Q 20/322 235/381 |
| 2013/0179245 | A1 * | 7/2013 | Simonoff | G06Q 30/0222 705/14.23 |
| 2013/0185150 | A1 * | 7/2013 | Crum | G06Q 30/0222 705/26.8 |
| 2013/0240622 | A1 * | 9/2013 | Zhou | G06Q 20/321 235/379 |
| 2013/0346302 | A1 * | 12/2013 | Purves | G06Q 20/102 705/40 |
| 2014/0019277 | A1 * | 1/2014 | Lindsey | G06Q 20/425 705/21 |
| 2014/0019317 | A1 * | 1/2014 | Casares | G06Q 30/06 705/30 |
| 2014/0081854 | A1 * | 3/2014 | Sanchez | G06Q 20/42 705/16 |
| 2014/0297381 | A1 * | 10/2014 | Park | G06Q 20/385 705/14.23 |
| 2015/0106215 | A1 * | 4/2015 | Craig | G06Q 20/202 705/17 |
| 2015/0154592 | A1 * | 6/2015 | Ioannidis | G06Q 20/387 705/64 |
| 2015/0248664 | A1 * | 9/2015 | Makhdumi | G06Q 20/3274 235/380 |
| 2015/0254637 | A1 * | 9/2015 | Yang | G06K 19/07732 235/375 |
| 2015/0339696 | A1 * | 11/2015 | Zhou | G06Q 20/322 705/14.23 |
| 2016/0104155 | A1 * | 4/2016 | Mcgaugh | G06Q 20/325 705/65 |
| 2016/0104221 | A1 * | 4/2016 | Zakusilo | G06Q 30/0605 705/26.2 |
| 2016/0110695 | A1 * | 4/2016 | Zhou | G06Q 20/386 705/27.1 |
| 2016/0189137 | A1 * | 6/2016 | Zhou | G06Q 30/0601 705/14.34 |
| 2016/0275482 | A1 * | 9/2016 | Zhou | G06K 19/06112 |
| 2017/0076273 | A1 * | 3/2017 | Xing | G07G 1/14 |
| 2017/0161717 | A1 * | 6/2017 | Xing | G06Q 20/3278 |
| 2017/0221087 | A1 * | 8/2017 | Xing | G06Q 20/405 |
| 2017/0262833 | A1 * | 9/2017 | Xing | G06Q 30/0226 |
| 2018/0181978 | A1 * | 6/2018 | Weinberger | G06Q 20/387 |
| 2018/0285857 | A1 * | 10/2018 | Yang | G06Q 20/3276 |
| 2018/0314536 | A1 * | 11/2018 | Wang | G06Q 20/326 |
| 2020/0273017 | A1 * | 8/2020 | Mossoba | G06Q 20/3224 |
| 2021/0019732 | A1 * | 1/2021 | Gulchenko | G06Q 20/385 |
| 2021/0272093 | A1 * | 9/2021 | Sassaman | G06Q 20/322 |
| 2022/0027979 | A1 * | 1/2022 | Bruno | G06Q 30/0251 |

* cited by examiner

SYSTEMS AND METHODS FOR PROVIDING COMPENSATION, REBATE, CASHBACK, AND REWARD FOR USING MOBILE AND WEARABLE PAYMENT SERVICES, DIGITAL CURRENCY, NFC TOUCH PAYMENTS, MOBILE DIGITAL CARD BARCODE PAYMENTS, AND MULTIMEDIA HAPTIC CAPTURE BUYING

CROSS-REFERENCE TO RELATED APPLICATIONS

This application is a continuation in part of U.S. patent application Ser. No 15/061,982, entitled "SYSTEMS AND METHODS FOR PROVIDING COMPENSATION, REBATE, CASHBACK, AND REWARD FOR USING MOBILE AND WEARABLE PAYMENT SERVICES, DIGITAL, CURRENCY, NFC TOUCH PAYMENTS, MOBILE DIGITAL CARD BARCODE PAYMENTS, AND MULTIMEDIA HAPTIC CAPTURE BUYING" filed on Mar. 4, 2016, which claims priority to U.S. patent application Ser. No. 14/815,988, entitled "SYSTEMS AND METHODS FOR MOBILE APPLICATION, WEARABLE APPLICATION, TRANSACTIONAL MESSAGING, CALLING, DIGITAL MULTIMEDIA CAPTURE AND PAYMENT TRANSACTIONS", filed on Aug. 1, 2015, which claims priority to U.S. patent application Ser. No. 14/034,509, entitled "EFFICIENT TRANSACTIONAL MESSAGING BETWEEN LOOSELY COUPLED CLIENT AND SERVER OVER MULTIPLE INTERMITTENT NETWORKS WITH POLICY BASED ROUTING", filed on Sep. 23, 2013, and which claims priority to U.S. patent application Ser. No. 10/677,098, entitled "EFFICIENT TRANSACTIONAL MESSAGING BETWEEN LOOSELY COUPLED CLIENT AND SERVER OVER MULTIPLE INTERMITTENT NETWORKS WITH POLICY BASED ROUTING", filed on Sep. 30, 2003, which claims priority to U.S. Provisional Patent Application No. 60/415,546, entitled "DATA PROCESSING SYSTEM", filed on Oct. 1, 2002, which are incorporated herein by reference in their entirety.

FIELD

This application relates generally to payment methods using mobile devices in various retail environments and, more specifically, to computer implemented methods and systems for facilitating mobile device payments using codes and cashback business model.

BACKGROUND

When customers buy product items from various merchants in retail environments, such as retail outlets, shopping centers, stores, etc., only a handful of payment methods is available to the customers. Typical examples include cash, checks, gift cards, credit cards, debit cards, and mobile payments. Each of these payment methods has some drawbacks from cost and/or convenience perspective. For example, checks and cash transactions are slow and require additional processing and/or handling. Such drawbacks interfere with retail transactions and add some level of dissatisfaction. Credit cards require substantial processing fees, while debit cards require availability of funds and sometimes involve surcharges as well. Typically, interchange and processing fees for a complete credit/debit card transaction may reach a significant amount. Using a mobile payment model, the customer may save on processing fees and even receive some cash back.

At the same time, the customer typically visits the same group of stores repeatedly, and these payment transaction fees tend to accumulate. While some stores try to issue their own credit-like account systems and employ banks to help them in this endeavor (e.g., Sears-Chase VISA), many stores are simply too small to build and operate systems similar to those provided by the major credit card companies and/or banks. Furthermore, a typical customer repeatedly visits multiple retail outlets. Continuous usage of multiple retail cards (or other security/transactional devices) each one being specific to only one of these outlets may be difficult, if not unreasonable. For example, the typical customer may use a few gas stations (e.g., depending on his location), a few grocery stores (e.g., depending on preferences), a few electronic stores (e.g., depending on current sales and promotions). Complexities introduced by store specific account systems may quickly offset any costs savings or cause inconvenience associated with traditional methods of payments and may make an overall experience even worse. Taking into account the aforesaid, purchasing with mobile devices using codes encoding customer payment information would facilitate the purchasing process, while merchant affiliate marketing programs and/or group buying offers would attract new customers by providing additional cashback.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Provided are methods and systems for facilitating mobile device payments using codes and cashback business model and providing compensation for using a mobile payment service. In general, these methods and systems are designed to improve and facilitate art overall purchasing and selling process as well as to attract regular customers by creating various cashback incentives.

According to the methods and systems disclosed herein, a customer may provide his payment information via a user interface of a customer mobile device. The customer payment information may include data on a credit/debit card or a bank checking account. Having specified the payment information, the customer may receive a unique code encoding his payment information. The unique code may be displayed on a screen of the customer mobile device and may be further scanned by a payment receiver mobile device to transfer payment for a purchase. Additionally, the customer may be encouraged to further use a mobile payment service by receiving a predetermined amount of cashback for participating in an affiliate marketing or loyalty program. Besides cashback, the customer may also receive a discount or a gift card, or may also be rewarded with credits for using bank checking accounts to pay within a mobile payment system or discounts for promoting a merchant.

BRIEF DESCRIPTION OF DRAWINGS

Embodiments are illustrated by way of example and not limitation in the figures of the accompanying drawings, in which like references indicate similar elements and in which.

DETAILED DESCRIPTION

Figure 1:
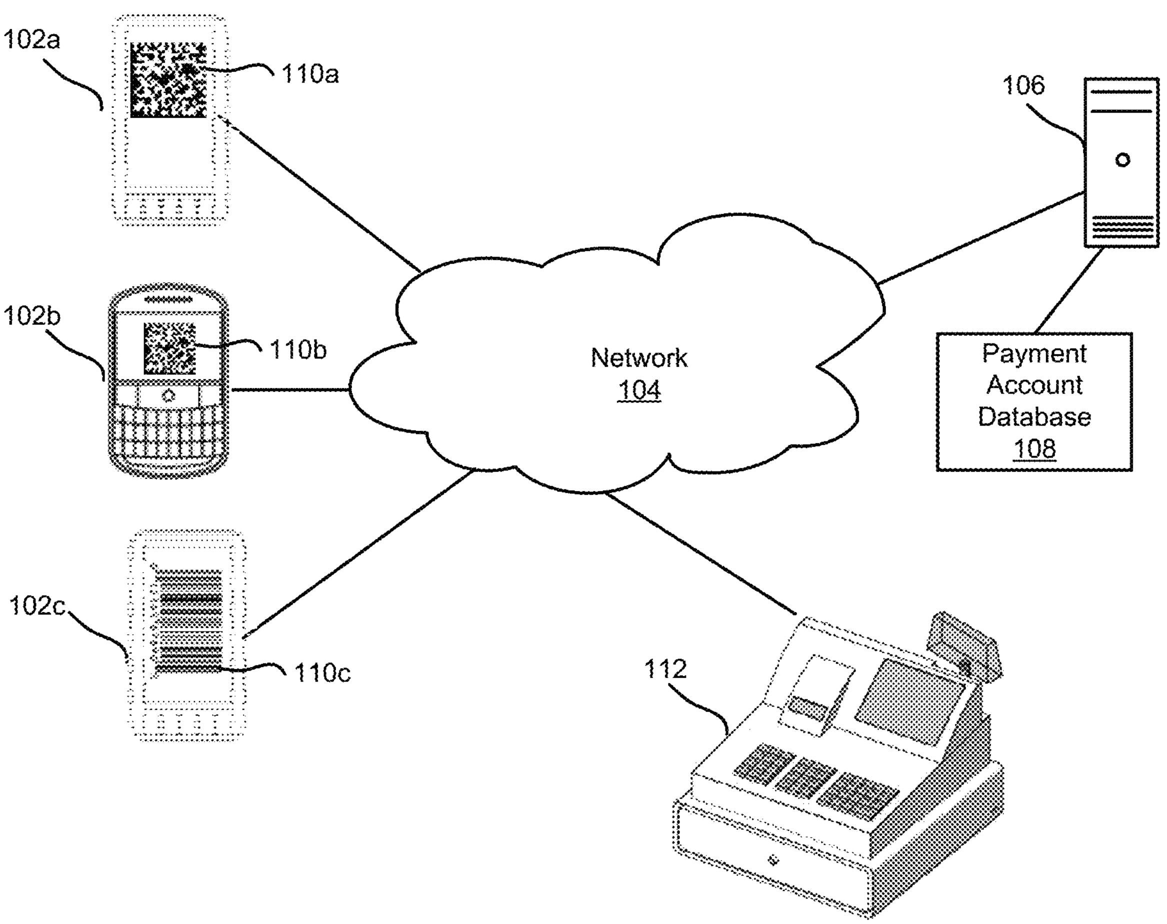
FIG. 1 is a block diagram illustrating overall sample environment within which methods and systems for facilitating mobile device payments are implemented, in accordance with certain embodiments.

Various computer implemented methods and systems for facilitating mobile device payments using barcodes and cashback business model are described herein. Recent proliferation of mobile devices (e.g., cell phones/smart phones and other similar devices) that are capable of generating and displaying various optical codes (e.g., barcodes) allows implementing these novel methods and systems. Most customers shopping nowadays in retail environments carry such mobiles devices.

Product barcodes are typically provided as barcodes, such as linear barcodes and two-dimensional barcodes, as well as human readable alphanumeric codes. Displaying a barcode may involve processing information to encode into a barcode image. The local processing may be performed using various software applications installed on the mobile device. For example, the Universal Product Code (UPC) or European Article Number (EAN) may be used. UPC is a barcode symbology widely used in North America and other countries for tracking trade items in stores. Its common form, the UPC-A, consists of 12 numerical digits, which are uniquely assigned to each individual trade/product item. Each UPC-A barcode consists of a scannable strip of black bars and white spaces, above a sequence of 12 numerical digits. No letters, characters, or other content of any kind may appear on a standard UPC-A barcode. The digits and bars maintain a one-to-one correspondence. In other words, there is only one way to represent each 12-digit number visually, and there is only one way to represent each visual barcode numerically. EAN is another example developed as a superset of UPC. An EAN-13 barcode, a 13 digit EAN barcoding standard, also indicates the country in which the company that sells the product is based. EAN and UPC barcodes are currently the only barcodes allowed for scanning trade/product items at the point of sale. However, other codes may be available in the future and within the scope of this document.

One having ordinary skills in the art would understand that the term "scanning" is not limited to printed codes having particular formats but may be used for codes encoded electronically and using various other means. For example, product barcodes may be in the form of the recently developed Electronic Product Code (EPC) designed as a universal identifier that provides a unique identity for every physical object (not just a trade item category) anywhere in the world. It should be noted that EPCs are not exclusively used with RFID data carriers. They may be constructed based on reading of optical data carriers, such as linear bar codes and two-dimensional bar codes, such as Data Matrix symbols. For purposes of this document, all optical data carriers are referred herein as "barcodes."

Scanning a barcode may involve capturing an image of the barcode using a simple imaging device installed on a mobile device, such as a digital camera. The image may be then processed on the mobile device to retrieve corresponding product information. In certain embodiments, the image may be considered as product information, which may be sent to a server for further processing. The local processing may be performed using various software installed on the mobile device. In certain embodiments, a mobile device may contain a local database to match the retrieved product information with additional information about this product. However, because of variable nature of this additional information (e.g., pricing, product description), the mobile device then typically transmits the retrieved product information to the server and then receives some additional information from the server.

In certain embodiments, upon providing data on a credit or debit card, or a bank checking account via a user interface of the mobile device, the user may receive a unique code encoding his payment information. To pay for products, the unique code may be scanned by a payment receiver mobile device.

The methods described herein may be performed by any mobile devices with wireless communication capabilities. In addition to being capable of transmitting voice-based signals, many modern cell phones also have internet connectivity using cellular networks (e.g., 3G, 4G) as well as Wi-Fi and other types of networks. Some additional examples of such networks are described below with reference to FIG. 1. Wireless communication may be used to transmit retrieved product information to the server, receive replies, and transmit authorizations. Overall, various data may be exchanged between the mobile devices and the server as well as other servers during operations of the method.

Referring now to figures, FIG. 1 is a block diagram illustrating overall sample environment within which methods and systems for facilitating mobile device payments are implemented, in accordance with certain embodiments. As shown in FIG. 1, multiple mobile devices **102*a*, 102*b*, 102*c* may be configured to display barcodes 110*a*, 110*b*, 110*c*. Various examples of barcodes have been described above. Mobile devices 102*a*, 102*b*, 102*c* communicate with a server 106 via a network 104. The server 106 may be a payment server or any other server configured to perform operations further described with reference to FIG. 5. The server 106 is a part of a payment processing system, which may include a payment account database 108 and one or more checkout counters 112. The network 104 may be also used for communication among various components of the payment processing system. The network 104 may include type of network capable of communicating data, such as, for example, a wide area network or Internet and/or one or more local area networks (LAN's). The network 104** may also include any suitable number and type of devices, e.g., routers and switches, for forwarding commands, content, and/or web object requests from each client to the online community application and responses back to the clients.

The methods described herein may also be practiced in a wide variety of network environments including, for example, TCP/IP-based networks, telecommunications networks, wireless networks, etc. In addition, the methods described herein may be executed by computer program instructions stored in any type of computer-readable media. The computer program may be executed according to a variety of computing models including a client/server model, a peer-to-peer model, on a stand-alone computing device, or according to a distributed computing model in which various functionalities described herein may be effected or employed at different locations.

Figure 2:
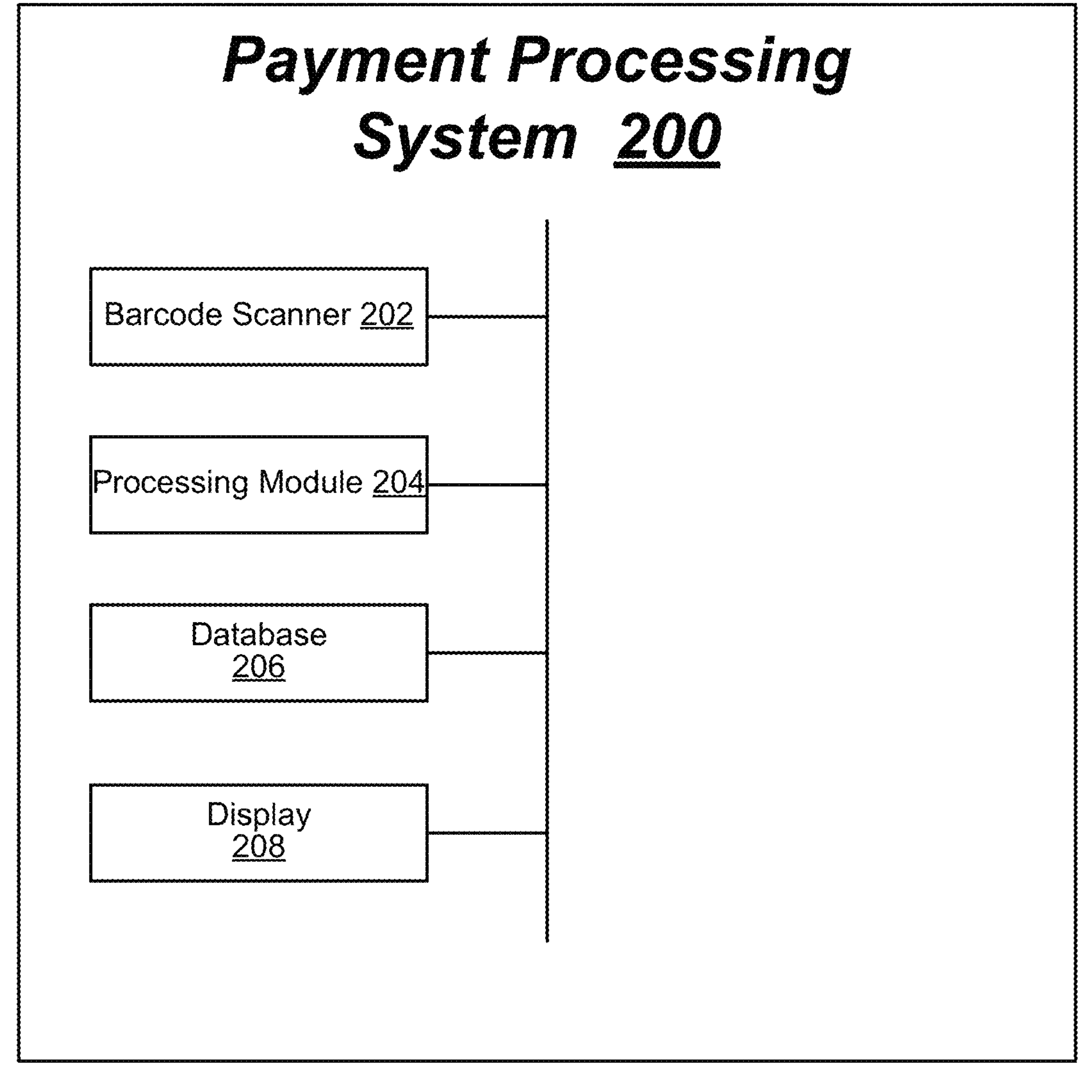
FIG. 2 is a block diagram showing various modules of the payment processing system, in accordance with certain embodiments.

FIG. 2 is a block diagram showing various modules of payment processing system, in accordance with certain embodiments. Specifically, a payment processing system 200 may include a barcode scanner 202 for scanning a barcode displayed on a screen of the mobile device. The barcode scanner 202 may be provided at a checkout counter. The payment processing system 200 may also include a processing module 204 for retrieving customer payment information from the scanned barcode. In certain embodiments, the payment processing system 200 includes a database 206 for storing one or more customer records. The payment processing system 200 may also include a display 208 for displaying the one or more customer records. In certain embodiments, the display 208 may be provided at the checkout counter together with the barcode scanner 202.

Figure 3:
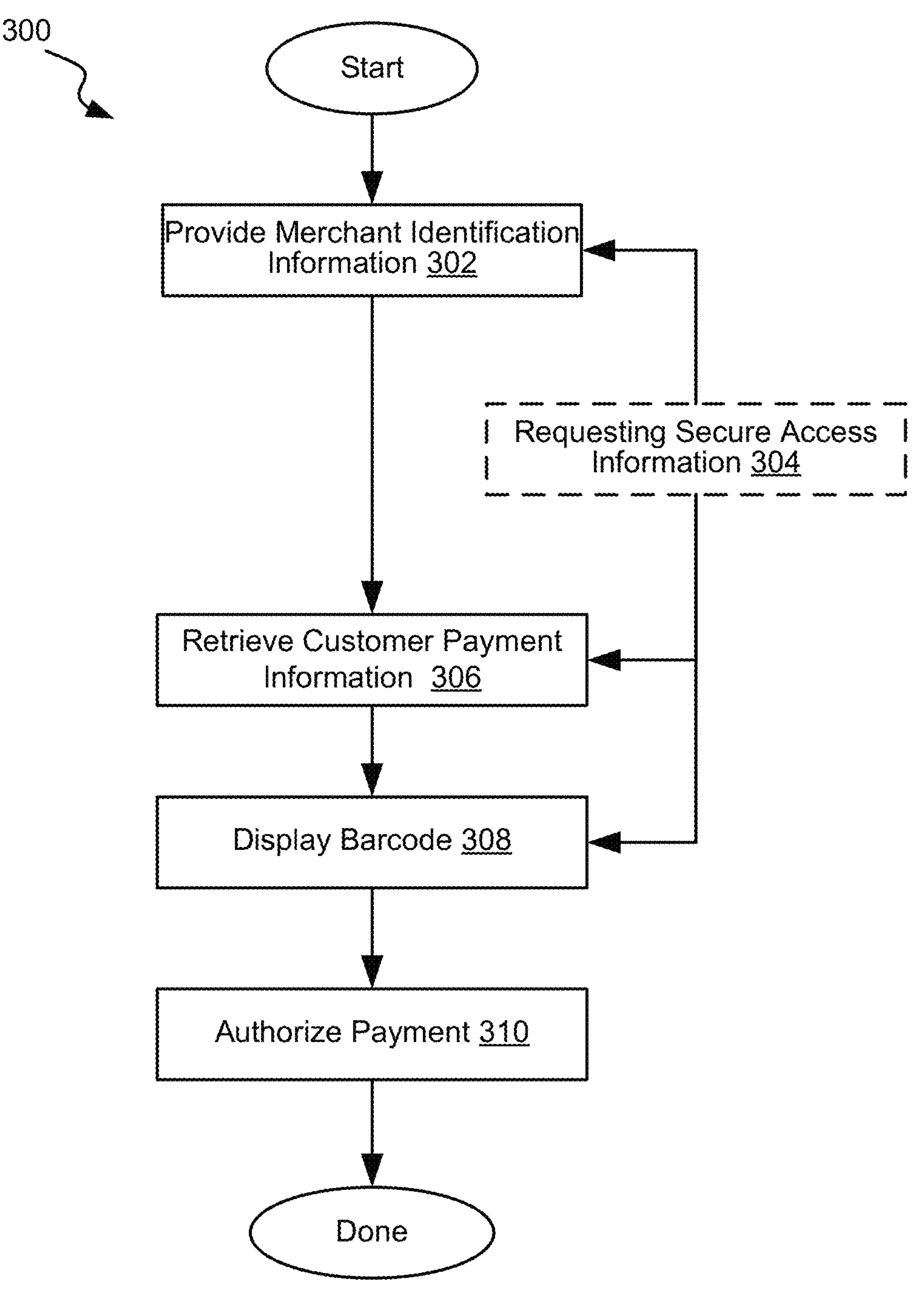
FIG. 3 is a flow chart illustrating a method for facilitating mobile device payments using a barcode displayed on a mobile device, in accordance with certain embodiments.

FIG. 3 is a flow chart illustrating a method for facilitating mobile device payments using a barcode displayed on a mobile device, in accordance with certain embodiments. A process 300 may start with providing merchant identification information on scanning a product barcode at operation 302. For example, the mobile device may be used to capture an image of the product barcode. This image is then processed by the mobile device to retrieve product information encoded in the product barcode. In certain embodiments, an actual image of the product barcode is considered being product information and it is transmitted to a payment server or some other server for further processing. Some examples of product information include an alphanumeric representation corresponding to UPS, EAN, EPC, and other types of codes. This product information may be then correlated to the product related data retrieved by the payment server further described with reference to FIG. 5. However, in some instances, machine readable code cannot be scanned. For example, a product barcode image of a product item is damaged. In these instances, the merchant identification information may correspond to a merchant payment system. For example, the operation 302 may involve transmitting user identification information to the merchant payment system. The operation 302 may also involve displaying an alphanumeric string on a screen of the mobile device. The alphanumeric string also corresponds to the customer payment information. The alphanumeric string may be used by a retail clerk when the product barcode is not scannable, for example.

The process 300 may proceed with retrieving customer payment information based on the merchant identification information at operation 306. The customer payment information corresponds to a customer payment account maintained at the merchant payment system. The customer payment information may be stored in a memory of the mobile device. Alternatively, the customer payment information may be retrieved from the merchant payment system. The customer payment information may include a customer name, a customer account number, and/or an amount of available funds.

In certain embodiments, the process 300 may include an optional operation 304 performed prior to retrieving customer payment information at the operation 306. The operation 304 involves requesting secure access information on the interface of the mobile device. In certain embodiments, the mobile device includes a user interface for entering an alphanumeric entry corresponding to the merchant identification information.

The process 300 may also involve displaying a barcode on a screen of the mobile device at operation 308. The displayed barcode is scannable by a barcode scanner of the merchant payment system. This barcode encodes the customer payment information. It may be a linear barcode or a two-dimensional barcode.

The process 300 may also involve receiving and displaying product related information at operation 308. Some examples of the product related information may include product pricing information, product discount information, product description information, and complementary product information.

Finally, the process 300 may also involve authorizing payment at operation 310. The authorization is transmitted to the payment server and may be used for transferring funds between accounts and/or other purposes (e.g., authorizing credit).

Figure 4:
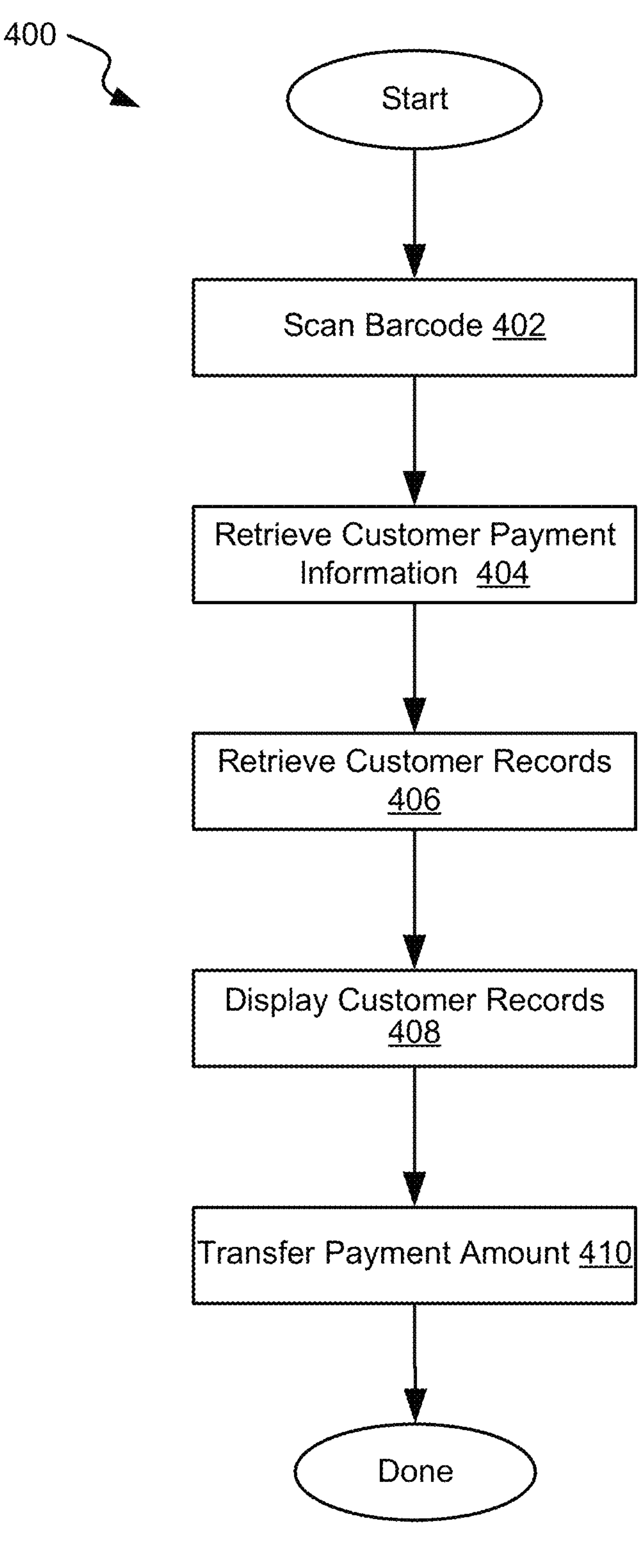
FIG. 4 is a flow chart illustrating a payment processing method using a merchant payment system, in accordance with certain embodiments.

FIG. 4 is a flow chart illustrating a payment processing method using a merchant payment system, in accordance with certain embodiments. A process 400 involves scanning a barcode displayed on a screen of the mobile device during operation 402. As stated above, the displayed barcode encodes customer payment information. This operation may be performed at a checkout counter. The process 400 may proceed with retrieving the customer payment information from the scanned barcode at operation 404. This operation may involve decoding the barcode and retrieving various data strings from the barcode. The customer payment information may be used to determine availability of funds. In other embodiments, availability of funds is determined from customer records retrieved at operation 406 described below.

The process 400 may then proceed with retrieving one or more customer records from a database of the merchant payment system at operation 406. These records correspond to the customer payment information. The process 400 may then proceed with displaying the one or more customer records at the checkout counter at operation 408. The process 400 may involve transferring a payment amount from customer account to a merchant account at operation 410. This operation may also involve updating the one or more customer records based on the transferred payment amount. The process 400 may also involve receiving user identification information from the mobile device and, based on the user identification information, transmitting the customer payment information to the mobile device.

Figure 5:
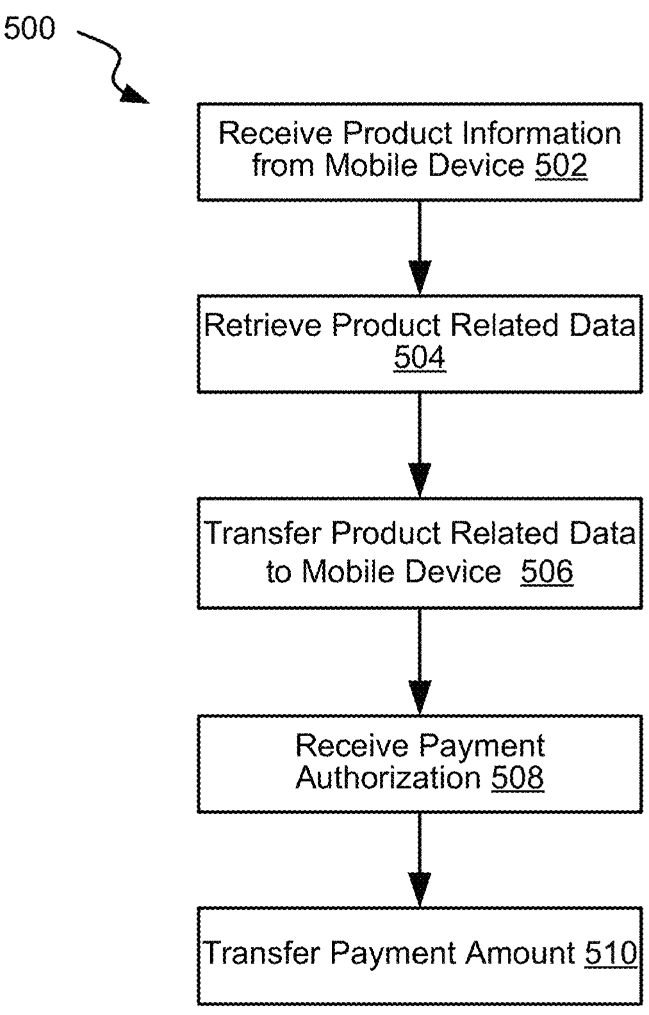
FIG. 5 is a flow chart illustrating a process for purchasing a product item in a retail environment using a payment server, in accordance with certain embodiments.

FIG. 5 is a flow chart illustrating a process 500 for purchasing a product item in a retail environment using the payment server, in accordance with certain embodiments. It should be noted that the process 300 described above with reference to FIG. 3 and the process 500 described herein are performed in parallel in different parts of the network. Specifically, operations of the process 300 are performed by one or more mobile devices, while operations of the process 500 are performed by one or more servers.

The process 500 involves receiving product information from the mobile device at operation 502. Examples of the product information are described above. Overall, the operation 502 is a server-side operation corresponding to the operation 306 described above with reference to FIG. 3. Based on the product information, the payment server or any other server may retrieve product related data at operation 504, which is then transmitted to the mobile device at operation 506. In certain embodiments, the product related data may be added into the product database. For example, when a merchant adds another product item (e.g., an SKU) to the retail environment, the corresponding product related information may be added to the product database. Various example of the product related data are described above. Furthermore, the process 500 may involve receiving used account information, which is a server-side operation corresponding to the operation 304 described above with reference to FIG. 3. Similar to the operation 304, the operations of adding the product related data into the product database and receiving the used account information may be performed at any moment prior to receiving payment authorization at operation 508. The authorization is sent by the mobile device and a secured protocol may be used for transmission. Based on this authorization, the process 500 may then involve transferring a payment amount at operation 510 from one account to another. In certain embodiments, the transferring involves crediting the payment amount.

Figure 6:
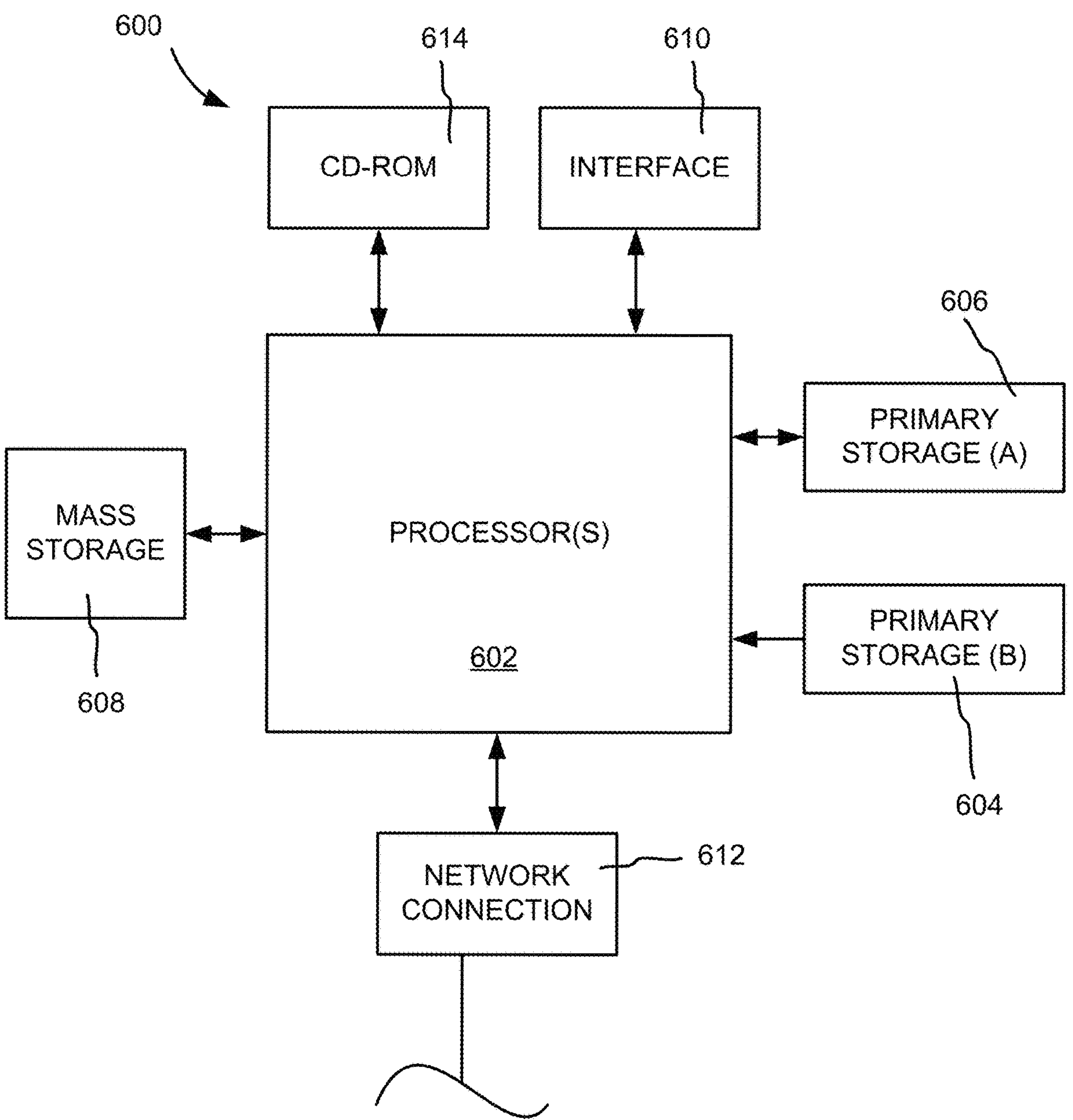
FIG. 6 illustrates a computer system within which a set of instructions for causing the machine to perform any one or more of the methodologies discussed herein is executed, in accordance with certain embodiments.

FIG. 6 illustrates a computer system within which a set of instructions for causing the machine to perform any one or more of the methodologies discussed herein is executed, in accordance with certain embodiments. A computer system 600 includes any number of processors 602 (also referred to as central processing units, or CPUs) that are coupled to storage devices including a primary storage 606 (typically a random access memory, or RAM), a primary storage 604 (typically a read only memory, or ROM). The CPU 602 may be of various types including microcontrollers and microprocessors such as programmable devices (e.g., CPLDs and FPGAs) and unprogrammable devices such as gate array ASICs or general purpose microprocessors. The primary storage 604 may act to transfer data and instructions uni-directionally to the CPU 602 and the primary storage 606 is used typically to transfer data and instructions in a bi-directional manner. Both of these primary storage devices may include any suitable computer-readable media such as those described above. A mass storage device 608 is also coupled bi-directionally to the CPU 602 and provides additional data storage capacity. The mass storage device 608 may include any of the computer-readable media described above. The mass storage device 608 may be used to store programs, data, and the like, and is typically a secondary storage medium such as a hard disk. It will be appreciated that the information retained within the mass storage device 608, may, in appropriate cases, be incorporated in standard fashion as a part of the primary storage 606 as a virtual memory. A specific mass storage device such as a CD-ROM 614 may also transmit data uni-directionally to the CPU 602.

In addition, the computer program instructions to perform any one or more of the methodologies discussed herein may be stored in any type of computer-readable media.

The CPU 602 may also be coupled to an interface 610 that connects to one or more input/output devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, the CPU 602 may optionally be coupled to an external device such as a database or a computer or telecommunications network using a network connection 612. Being connected via a network, the CPU 602 may receive information from the network, or may output information to the network when performing the operations described herein.

The example embodiments described herein may be implemented in an operating environment including software installed on a computer, in hardware, or in a combination of software and hardware.

Figure 7:
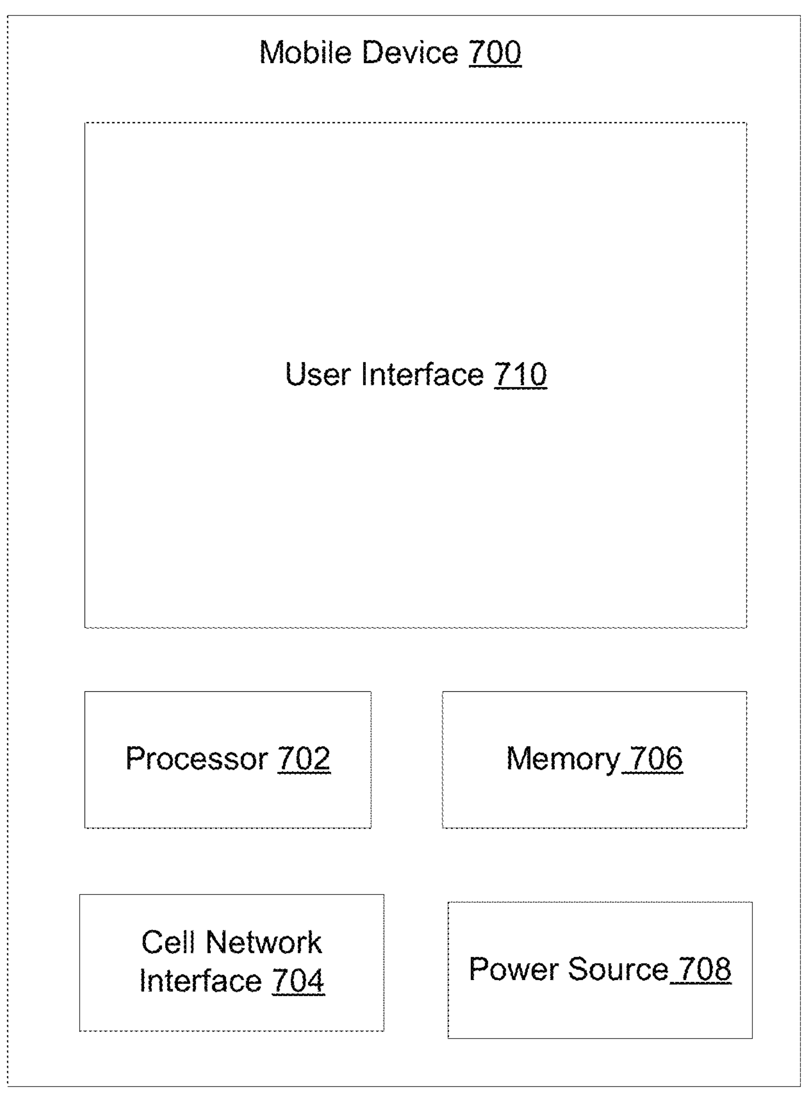
FIG. 7 illustrates an example of a mobile device, in accordance with certain embodiments.

FIG. 7 illustrates a particular example of a mobile device 700. The mobile device 700 includes a processor 702, a memory 706, a user interface 710, a cellular network interface 704, and a power source 708. The processor 702 may be specifically configured to encode information into one or more barcodes from the product barcodes. The user interface 710, such as an LCD screen, is configured to display one or more barcodes, product information, which, in certain embodiments, may be received from the payment server. The memory 706 may be configured to store various security features associated with the transaction. Furthermore, advanced processing, communicating, scanning and displaying capabilities of the mobile devices and more frequent use of these capabilities may need substantial power outputs provided by the power source 708.

Figure 8:
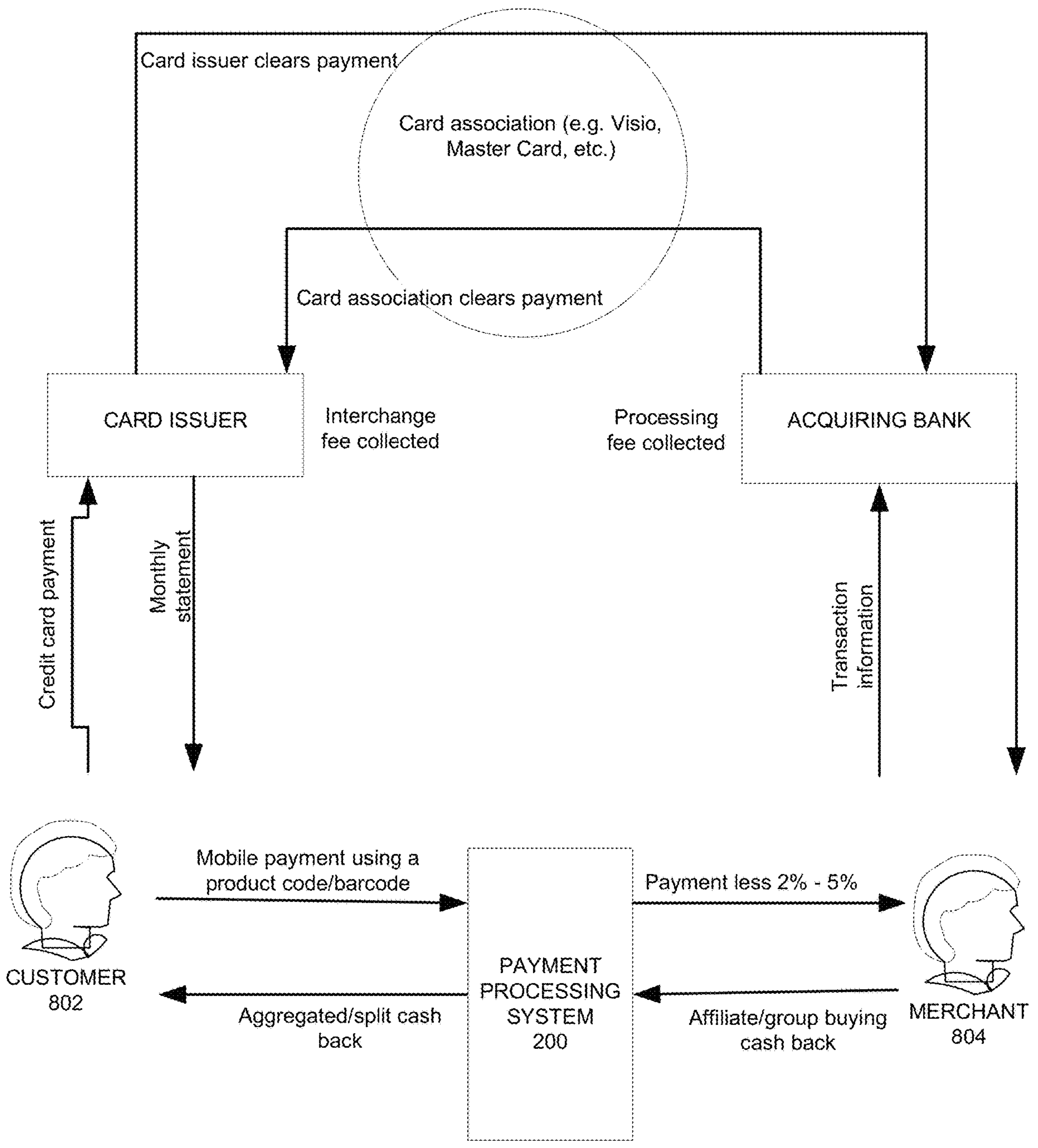
FIG. 8 is a block diagram showing an example of cashback business model, in accordance with certain embodiments.

In some example embodiments, a merchant may offer a cashback business model to one customer or a group of customers purchasing certain goods. FIG. 8 is a block diagram showing an example of cashback business model in accordance with various embodiments. A customer 802 may effect a direct mobile payment using barcodes and various software applications installed on his mobile device, in accordance with the processes illustrated in FIGS. 3 and 4 described above. For example, the Universal Product Code (UPC) or European Article Number (FAN) may be used. When effecting a direct mobile payment and using the processing system 200 configured accordingly, the customer 802 does not have to pay a usual amount of interchange and processing fees for his money transfer, and thereby the amount of interchange and processing fees may be paid back by a merchant 804 to the customer 802 as cashback.

In certain embodiments, the merchant 804 may use several cashback programs combined within a scope of his cashback business model. For example, the merchant 804 may participate in certain affiliate marketing programs and also offer some group buying models simultaneously. In this case, additionally to cashback for direct mobile payment (for example, the customer may receive cashback for the amount of interchange and processing fees saved), the merchant 804 may reward the customer 802 for participation in an affiliate marketing or loyalty program, and also pay cashback to the customer 802 or a group of customers for group buying of certain goods. In certain embodiments, the users may be also rewarded with a discount for participation in the affiliate marketing or loyalty program.

In certain embodiments, the user may receive a digital receipt containing information on cashback and discount. The digital receipt may be sent to a customer email.

In certain embodiments, the user may be also rewarded for spending a predetermined amount of money for purchasing a product or a group of products.

In certain embodiments, the user may be provided with a free mobile device for opening a mobile payment account via a mobile device of a dealer cooperating with a mobile payment service provider. Meanwhile, the mobile service provider may charge a percentage on the dealer and the user of the mobile payment service.

In certain embodiments, the payment processing system 200 may be additionally configured to split cashback for group buying among a certain number of customers comprising a group.

Figure 9:
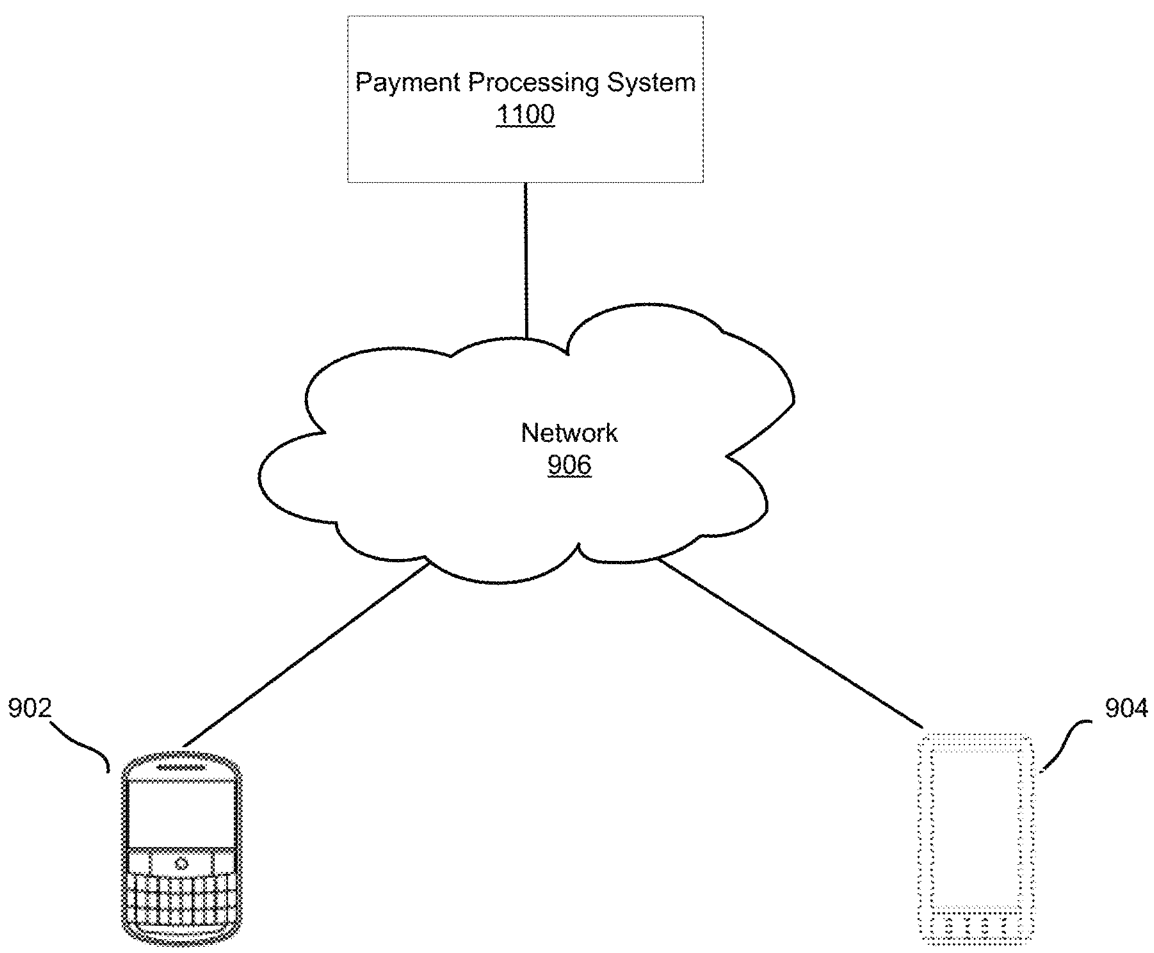
FIG. 9 is a block diagram illustrating a sample environment within which methods and systems for facilitating mobile device payments using unique codes and providing compensation for using a mobile payment service are implemented, in accordance with certain embodiments.

FIG. 9 is a block diagram illustrating a sample environment within which methods and systems for facilitating mobile device payments using unique codes and providing compensation for using a mobile payment service are implemented, in accordance with certain embodiments. As shown in FIG. 9, mobile devices 902 and 904 communicate with a payment processing system 1100 via a network 906. The network 906 may be also used for communication among various components of the payment processing system further described with reference to FIG. 11.

The network 906 may include the Internet or any other network capable of communicating data between devices. Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network 906 may further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking. The network 906 may be a network of data processing nodes that are interconnected for the purpose of data communication.

Figure 10:
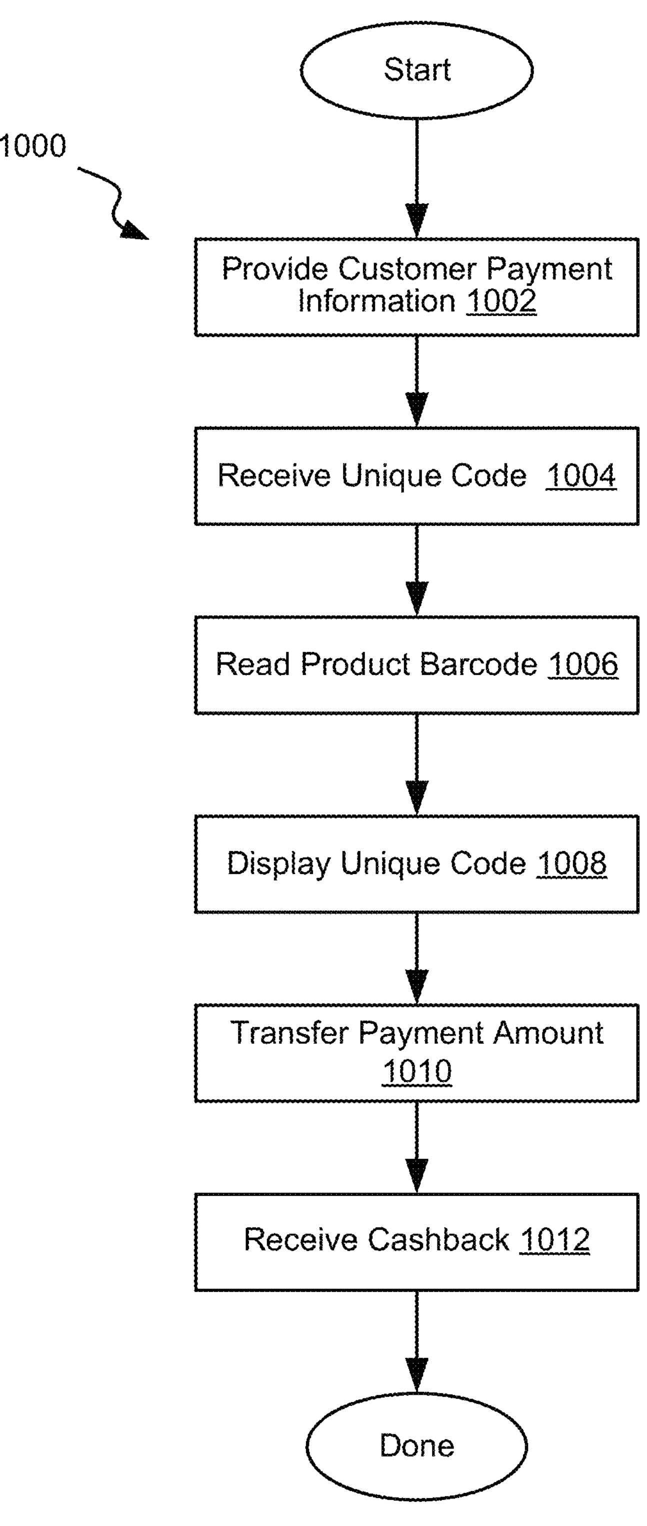
FIG. 10 is a flow chart illustrating a method for facilitating mobile device payments using unique codes and providing compensation for using a mobile payment service, in accordance with certain embodiments.

FIG. 10 is a flow chart illustrating a method for facilitating mobile device payments using unique codes and providing compensation for using a mobile payment service, in accordance with certain embodiments.

A method 1000 may start with providing customer payment information via an interface of a mobile device at operation 1002. The mobile device may include a cellular phone, a Personal Digital Assistant (PDA), a personal computer (e.g., a tablet or a laptop), a barcode scanner, and an RFID scanner. In general, any device that can be carried by a user into a retail environment, capable of retrieving one or more types of codes listed above, and capable of wirelessly communicating (e.g., via Wi-Fi network, 3G or 4G cellular network, or any other types of wireless communication networks) may be used. The operation 1002 may be started after the user has downloaded and set up an application on his mobile device.

In example embodiments, the customer payment information provided by the user may include data on a credit or debit card. In certain embodiments, the user may specify data of his bank checking account. In this case, the user may be further entitled to receive a predetermined amount of cashback or a credit.

The method 1000 may further include purchasing, for a price, using the mobile payment service, a mobile device or a wearable device operable to use the mobile payment service. The method may continue with receiving, by the processor of the mobile payment service, payment information associated with the purchase of the mobile device made via the mobile payment service. The payment information may be associated with a mobile payment account of a user in the mobile payment service who purchased the mobile device. The payment information may include at least financial account information of the user operable to complete a purchase transaction via the mobile payment service.

Upon providing the customer payment information, the user may receive a unique code at operation 1004. The unique code may be displayed on a screen of the mobile device and may encode the customer payment information. The unique code may include any code, such as, for example, a linear code, QR code, or arty other two-dimensional code. Once the unique code has been received, the user may set up a password for this unique code to assure a secure access to his payment account when transferring payment to a merchant.

In certain embodiments, the unique code may be received from a code issuer. The code issuer may include any financial institution or any mobile payment service provider, and the user may transfer payment directly to that code issuer, since the unique code may include all financial information of the code issuer.

At operation 1006, the user reads a product barcode with the mobile device. The reading of the product barcode may also include scanning the product barcode with the mobile device. To pay for a product, the user shows the unique code displayed on the screen of his mobile device at operation 1008 for a payment receiver to scan the unique code with the mobile device. The mobile devices of the payment receiver and the user may have the same applications installed. In certain embodiments, the applications may differ. In case the payment receiver and the user have the same applications installed, these applications may contain data on a merchant address, location, as well as information on a credit, discount, or cashback. In various embodiments, the applications installed may also include hyperlinks of social or other websites.

The method 1000 further proceeds with transferring a payment amount for the product at operation 1010.

In certain embodiments, the user may pay for the product using a mobile device of another user, since the mobile device of another user may have the same application installed.

In certain embodiments, the user may pay with digital mobile money received for cash provided by the user to a mobile payment service provider. The digital mobile money may be customer payment information encoded in a barcode scannable by a merchant scanning device.

Upon paying for the product, the user may be entitled to receive cashback at operation 1012 based on customer records stored in a database of the payment processing system. In certain embodiments, besides cashback, the user may also receive a discount or a gift card.

Figure 11:
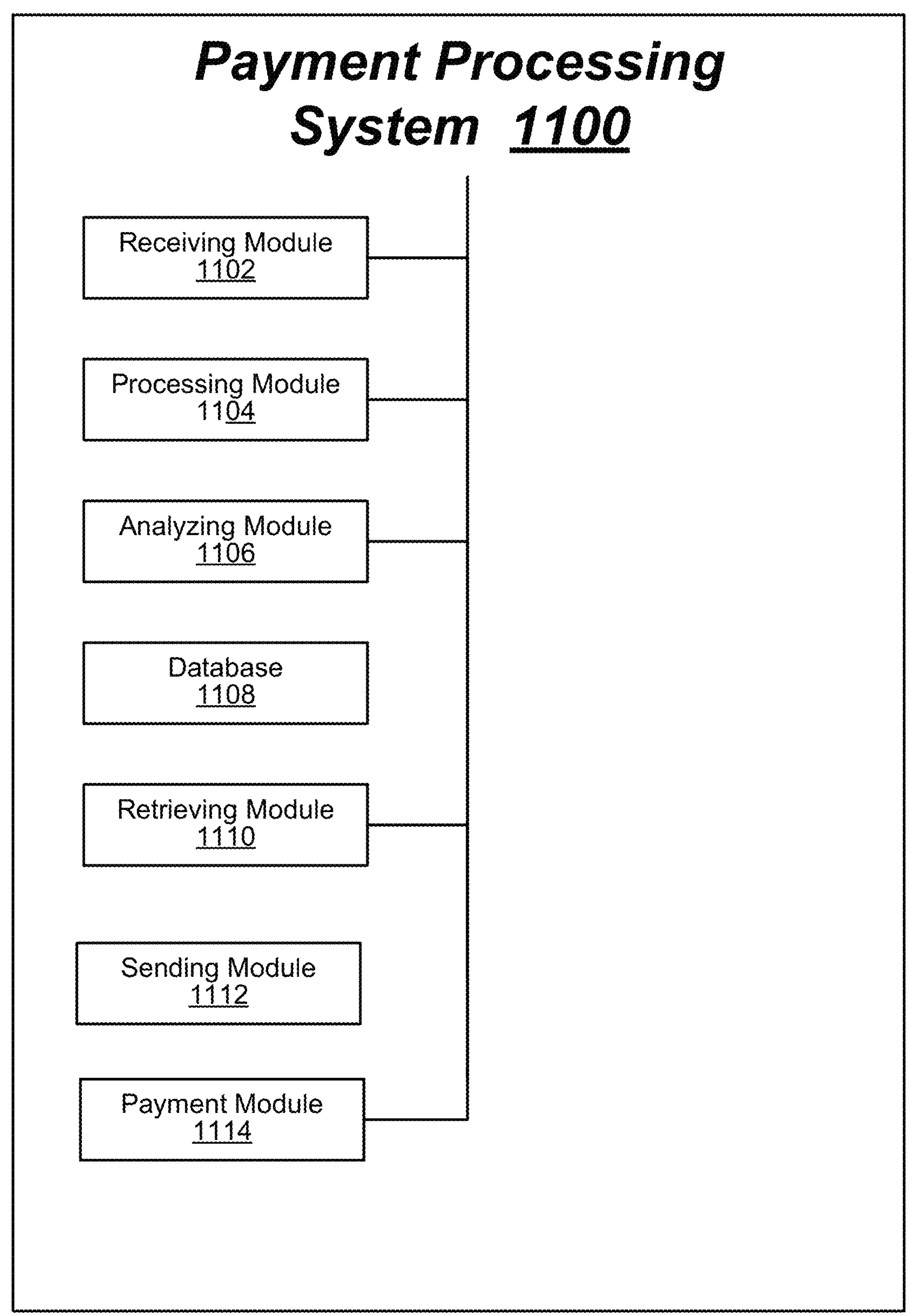
FIG. 11 is a block diagram showing various modules of a payment processing system for facilitating mobile device payments using unique codes and providing compensation for using a mobile payment service, in accordance with certain embodiments.

FIG. 11 is a block diagram showing various modules of a payment processing system for facilitating mobile device payments using unique codes and providing compensation for using a mobile payment service, in accordance with certain embodiments.

A payment processing system 1100 may include a receiving module 1102 for receiving the unique code displayed on the mobile device of the user. As stated above, the unique code may encode the customer payment information. The payment processing system 1100 may further include a processing module 1104 for retrieving the customer payment information from the unique code. The processing module 1104 may decode the unique code and retrieve various data strings from this unique code. The payment processing system 1100 may also include an analyzing module 1106 for determining availability of funds based on the customer payment information. The payment processing system 1100 may include a database 1108 for storing customer records. The customer records may include the customer payment information and cashback information and may be displayed on a screen of the payment receiver mobile device. In certain embodiment, the payment processing system 1100 may also include a retrieving module 1110 for retrieving the customer records from the database. The payment processing system 1100 may further include a sending module 1112 for sending receipts with detailed information on cashback and discount. The receipts may be sent to a customer email. The payment processing system 1100 may also include a payment module 1114 for receiving a payment amount from a customer account and providing a predetermined amount of cashback to a customer. The customer account may be automatically updated based on a payment amount transferred. The payment module 1114 may also be used for updating the customer records based on the payment amount received or transferred.

Thus, various systems and methods for purchasing a product item in a retail environment using a mobile device and a cashback business model have been described. Although embodiments have been described with reference to specific example embodiments, it will be evident, that various modifications and changes may be made to these embodiments without departing from the broader spirit and scope of the system and method described herein. Accordingly, the specification and drawings are to be regarded in an illustrative rather than a restrictive sense.

What is claimed is:

1. A computer-implemented method for facilitating mobile device payments and providing compensation for using a mobile payment service via a customer mobile device, the method comprising:

receiving, by a processor of the mobile payment service, from the customer mobile device associated with a user, product information associated with a purchase of one or more products made via the mobile payment service by the user using the customer mobile device, the product information being encoded in a product barcode of the one or more products, the product barcode being captured by the customer mobile device and displayed by a display of the customer mobile device for capturing by a payment receiver mobile device, the product information including at least information associated with the one or more products and a payment amount for the purchase of the one or more products;

upon capturing the product barcode, prompting the customer mobile device to match the product information with records of a local database stored on the customer mobile device;

prompting the customer mobile device to retrieve, based on the matching and from the local database, first additional information associated with the one or more products;

upon receiving the product information, selecting, by the processor of the mobile payment service, from a product database associated with the mobile payment service and stored on a server associated with the mobile payment service, second additional information associated with the one or more products;

transmitting, by the processor of the mobile payment service, the second additional information to the customer mobile device;

prompting the customer mobile device to display the first additional information and the second additional information to the user;

receiving, by the processor, from the customer mobile device, a customer payment information, the customer payment information being entered by the user via a user interface of the customer mobile device;

upon receiving the customer payment information, storing, by the processor of the mobile payment service, the customer payment information remotely from the customer mobile device;

based on the customer payment information, generating, by the processor, a unique code encoding the customer payment information;

upon generating the unique code, transmitting, by the processor, the unique code to the customer mobile device;

prompting, by the processor, the user to set a password for the unique code by entering the password on the customer mobile device by the user;

upon the receiving the product information, prompting, by the processor, the user to enter, via the customer mobile device, the password associated with the unique code;

upon entering the password by the user, displaying the unique code on a screen of the customer mobile device, the unique code being scannable by the payment receiver mobile device;

based on the scanning of the unique code by the payment receiver mobile device, transferring, by the processor, the payment amount for the purchase of the one or more products based on the customer payment information;

upon the transferring, updating, in a database associated with the mobile payment service, by the processor, customer records associated with the user by adding information associated with the payment amount and the information associated with the one or more products;

determining, by the processor, based on the product information, that the one or more products are associated with a predetermined group of products;

based on the determining that the one or more products are associated with the predetermined group of products, attributing, by the processor, the user to a group of customers associated with buying of the predetermined group of products;

upon the updating the customer records, determining, by the processor, based on the customer records retrieved from the database, that the user spent a predetermined amount of money for purchasing products associated with the predetermined group of products; and based on the attributing the user to the group of customers and the determining that the user spent the predetermined amount of money for purchasing the products associated with the predetermined group of products, selectively providing, by the processor, to the user, a predetermined amount of cashback for the purchase based on predetermined criteria.

2. The computer-implemented method of claim 1, wherein the unique code encoding the customer payment information includes one or more of the following: a unique QR code, a linier code, and a two-dimensional code.

3. The computer-implemented method of claim 1, further comprising receiving one or more of the following: a discount and a gift card.

4. The computer-implemented method of claim 1, wherein the customer payment information includes one or more of the following: a credit card, a debit card, and a bank checking account.

5. The computer-implemented method of claim 4, wherein one or more users link directly to the bank checking account and receive one or more of the following: a credit and the predetermined amount of cashback.

6. The computer-implemented method of claim 1, wherein the predetermined amount of cashback includes an aggregated cashback received by one or more users.

7. The computer-implemented method of claim 1, wherein the predetermined amount of cashback includes an amount of interchange and processing fees saved.

8. The computer-implemented method of claim 1, wherein the user participates in an affiliate marketing or loyalty program and receives one or more of the following: a discount and the predetermined amount of cashback.

9. The computer-implemented method of claim 1, further comprising providing the user with a reward for spending the predetermined amount of money for the purchase.

10. The computer-implemented method of claim 1, further comprising receiving the unique code from a code issuer.

11. The computer-implemented method of claim 10, wherein the user transfers the payment amount directly to the code issuer.

12. The computer-implemented method of claim 10, wherein the unique code includes financial information of the code issuer.

13. The computer-implemented method of claim 1, wherein the payment amount for the one or more products is transferred from a mobile device of another user, the mobile device of another user having the same application installed.

14. The computer-implemented method of claim 1, wherein one or more users of the mobile payment service receive a free mobile device for opening a mobile payment account via a mobile device of a dealer cooperating with a mobile payment service provider.

15. The computer-implemented method of claim 14, wherein the mobile payment service provider charges a percentage on the dealer and the one or more users of the mobile payment service.

16. The computer-implemented method of claim 1, further comprising receiving an email with detailed information of the predetermined amount of cashback and discount.

17. The computer-implemented method of claim 1, further comprising receiving digital mobile money for cash provided by the user.

18. The computer-implemented method of claim 17, wherein the digital mobile money is associated with the customer payment information encoded in a code, the code being scannable by a merchant scanning device.

19. A computer-implemented system for facilitating mobile device payments and providing compensation for using a mobile payment service via a customer mobile device, the system comprising a processor configured to:

receive, from the customer mobile device associated with a user, product information associated with a purchase of one or more products made via the mobile payment service by the user using the customer mobile device, the product information being encoded in a product barcode of the one or more products, the product barcode being captured by the customer mobile device and displayed by a display of the customer mobile device for capturing by a payment receiver mobile device, the product information including at least information associated with the one or more products and a payment amount for the purchase of the one or more products;

upon capturing the product barcode, prompt the customer mobile device to match the product information with records of a local database stored on the customer mobile device;

prompt the customer mobile device to retrieve, based on the matching and from the local database, first additional information associated with the one or more products;

upon receiving the product information, select, from a product database associated with the mobile payment service and stored on a server associated with the mobile payment service, second additional information associated with the one or more products;

transmit the second additional information to the customer mobile device;

prompt the customer mobile device to display the first additional information and the second additional information to the user;

receive, from the customer mobile device, a customer payment information, the customer payment information being entered by the user via a user interface of the customer mobile device;

upon receiving the customer payment information, store the customer payment information remotely from the customer mobile device;

based on the customer payment information, generate a unique code encoding the customer payment information;

upon generating the unique code, provide a transmit the unique code to the customer mobile device;

prompt the user to set a password for the unique code by entering the password on the customer mobile device by the user;

upon the receiving the product information, prompt the user to enter, via the customer mobile device, the password associated with the unique code;

upon entering the password by the user, display the unique code on a screen of the customer mobile device, the unique code being scannable by the payment receiver mobile device;

based on the scanning of the unique code by the payment receiver mobile device, transfer the payment amount for the purchase of the one or more products based on the customer payment information;

upon the transferring, update, in a database associated with the mobile payment service, customer records associated with the user by adding information associated with the payment amount and the information associated with the one or more products;

determine, based on the product information, that the one or more products are associated with a predetermined group of products;

based on the determining that the one or more products are associated with the predetermined group of products, attribute the user to a group of customers associated with group buying of the predetermined group of products;

upon the updating the customer records, determine, based on the customer records retrieved from the database, that the user spent a predetermined amount of money for purchasing products associated with the predetermined group of products; and based on the attributing the user to the group of customers and the determining that the user spent the predetermined amount of money for purchasing the products associated with the predetermined group of products, selectively provide to the user a predetermined amount of cashback for the purchase based on predetermined criteria.

20. The computer-implemented system of claim 19, wherein the unique code encoding the customer payment information includes one or more of the following: a unique QR code, a linier code, and a two-dimensional code.

21. The computer-implemented system of claim 19, wherein the customer payment information includes one or more of the following: a credit card, a debit card, and a bank checking account.

22. The computer-implemented system of claim 21, wherein one or more users link directly to the bank checking account and receive one or more of the following: a credit and the predetermined amount of cashback.

23. The computer-implemented system of claim 19, wherein the predetermined amount of cashback includes an aggregated cashback received by one or more users.

24. The computer-implemented system of claim 19, wherein the predetermined amount of cashback includes an amount of interchange and processing fees saved.

25. The computer-implemented system of claim 19, wherein the user participates in an affiliate marketing or loyalty program and receives one or more of the following: a discount and the predetermined amount of cashback.

26. The computer-implemented system of claim 19, further comprising providing the user with a reward for spending the predetermined amount of money for the purchase.

27. The computer-implemented system of claim 19, further comprising receiving the unique code from a code issuer.

28. The computer-implemented system of claim 27, wherein the user transfers the payment amount directly to the code issuer.

29. The computer-implemented system of claim 27, wherein the unique code includes financial information of the code issuer.

30. The computer-implemented system of claim 19, wherein the payment amount for the one or more products is transferred from a mobile device of another user, the mobile device of another user having the same application installed.

31. The computer-implemented system of claim 19, wherein one or more users of the mobile payment service receive a free mobile device for opening a mobile payment account via a mobile device of a dealer cooperating with a mobile payment service provider.

32. The computer-implemented system of claim 31, wherein the mobile payment service provider charges a percentage on the dealer and the one or more users of the mobile payment service.

33. The computer-implemented system of claim 19, wherein the processor is further configured to receive an email with detailed information of the predetermined amount of cashback and discount.

34. The computer-implemented system of claim 19, wherein the processor is further configured to receive digital mobile money for cash provided by the user.

35. The computer-implemented system of claim 34, wherein the digital mobile money is associated with the customer payment information encoded in a code, the code being scannable by a merchant scanning device.

36. A payment processing system for facilitating mobile device payments and providing compensation for using a mobile payment service via a customer mobile device, the system comprising:

a processing module configured to:

receive, from the customer mobile device associated with a user, product information associated with a purchase of one or more products made via the mobile payment service by the user using the customer mobile device, the product information being encoded in a product barcode of the one or more products, the product barcode being captured by the customer mobile device and displayed by a display of the customer mobile device for capturing by a payment receiver mobile device, the product information including at least information associated with the one or more products and a payment amount for the purchase of the one or more products;

upon capturing the product barcode, prompt the customer mobile device to match the product information with records of a local database stored on the customer mobile device;

prompt the customer mobile device to retrieve, based on the matching and from the local database, first additional information associated with the one or more products;

upon receiving the product information, select, from a product database associated with the mobile payment service and stored on a server associated with the mobile payment service, second additional information associated with the one or more products;

transmit the second additional information to the customer mobile device;

prompt the customer mobile device to display the first additional information and the second additional information to the user;

receive, from the customer mobile device, a customer payment information, the customer payment information being entered by the user via a user interface of the customer mobile device;

upon receiving the customer payment information, store the customer payment information remotely from the customer mobile device;

based on the customer payment information, generate a unique code encoding the customer payment information;

upon generating the unique code, transmit the unique code to the customer mobile device;

prompt the user to set a password for the unique code by entering the password on the customer mobile device by the user;

upon the receiving the product information, prompt the user to enter, via the customer mobile device, the password associated with the unique code;

upon entering the password by the user, display the unique code on a screen of the customer mobile device, the unique code being scannable by the payment receiver mobile device;

upon transferring the payment amount for the purchase of the one or more products, update, in a database associated with the mobile payment service, customer records associated with the user by adding information associated with the payment amount and the information associated with the one or more products;

determine, based on the product information, that the one or more products are associated with a predetermined group of products;

based on the determining that the one or more products are associated with the predetermined group of products, attribute, the user to a group of customers associated with group buying of the predetermined group ofproducts; and upon the updating the customer records, determine, based on the customer records retrieved from the database, that the user spent a predetermined amount of money for purchasing products associated with the predetermined group of products;

an analyzing module configured to determine availability of funds based on the customer payment information;

the database configured to store the customer records, the customer records including at least the customer payment information;

a retrieving module configured to retrieve the customer records from the database;

a sending module configured to send email receipts with detailed information on a predetermined amount of cashback and discount; and a payment module configured to:

based on the scanning of the unique code by the payment receiver mobile device, transfer the payment amount for the purchase of the one or more products from a customer account based on the customer payment information; and based on the attributing the user to the group of customers and the determining that the user spent the predetermined amount of money for purchasing the products associated with the predetermined group of products, selectively provide to the user the predetermined amount of cashback based on predetermined criteria.

37. The payment processing system of claim 36, wherein the customer records further include cashback information.

38. The payment processing system of claim 37, wherein the customer records are displayed on a screen of the payment receiver mobile device.

39. The payment processing system of claim 36, wherein the customer account is automatically updated based on the payment amount transferred.

* * * * *